US010902600B2

(12) United States Patent
Zhao et al.

(10) Patent No.: US 10,902,600 B2
(45) Date of Patent: Jan. 26, 2021

(54) SEGMENTATION-BASED INVASION SPORTS ANALYSIS AND CONTROL

(71) Applicant: INTERNATIONAL BUSINESS MACHINES CORPORATION, Armonk, NY (US)

(72) Inventors: Kun Zhao, Funabashi (JP); Takayuki Osogami, Yamato (JP); Tetsuro Morimura, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 16/266,199

(22) Filed: Feb. 4, 2019

(65) Prior Publication Data

US 2020/0250828 A1    Aug. 6, 2020

(51) Int. Cl.
| | |
|---|---|
| *G06T 7/11* | (2017.01) |
| *G06K 9/00* | (2006.01) |
| *G06T 7/136* | (2017.01) |
| *G06T 7/70* | (2017.01) |
| *G06N 7/00* | (2006.01) |

(52) U.S. Cl.
CPC ............ *G06T 7/11* (2017.01); *G06K 9/00724* (2013.01); *G06N 7/005* (2013.01); *G06T 7/136* (2017.01); *G06T 7/70* (2017.01); *G06K 2009/00738* (2013.01); *G06T 2207/30221* (2013.01)

(58) Field of Classification Search
None
See application file for complete search history.

(56) References Cited

U.S. PATENT DOCUMENTS

| | | | |
|---|---|---|---|
| 9,364,747 B2* | 6/2016 | Meyer | A63F 13/10 |
| 2006/0075454 A1* | 4/2006 | Jung | H04N 21/854 725/135 |
| 2015/0163562 A1* | 6/2015 | Leventhal | H04N 21/8549 725/116 |
| 2016/0071548 A1 | 3/2016 | House et al. | |
| 2017/0165581 A1* | 6/2017 | McAuley | A63F 13/65 |
| 2017/0300755 A1 | 10/2017 | Bose et al. | |
| 2019/0091541 A1* | 3/2019 | Schulte | H04L 12/00 |
| 2020/0005165 A1* | 1/2020 | Baughman | G06N 5/04 |

FOREIGN PATENT DOCUMENTS

CN         107137886         9/2017

OTHER PUBLICATIONS

Wei, X.—"Large-Scale Analysis of Formations in Soccer"—2013 IEEE—pp. 1-8 (Year: 2013).*

(Continued)

*Primary Examiner* — Bernard Krasnic
(74) *Attorney, Agent, or Firm* — Tutunjian & Bitetto, P.C.; Randall Bluestone (57) ABSTRACT

Methods and systems for game event analysis and control include determining segmentation events in a game that each represent an interruption in game play or a reset scene. An event analysis is performed using the series of events to determine a contribution value for each event in the series of events that represents how much each respective event in the series of events contributed to the point being scored. Events that have a contribution value that exceeds a baseline value for a respective event type are responded to.

16 Claims, 4 Drawing Sheets

(56) References Cited

OTHER PUBLICATIONS

Michael Horton et al., "Automated Classification of Passing in Football", AKDD 2015: Advances in Knowledge Discovery and Data Mining, May 2015.

Manuel Stein et al., "Bring it to the Pitch: Combining Video and Movement Data to Enhance Team Sport Analysis", in IEEE Transactions on Visualization and Computer Graphics, vol. 24, No. 1, pp. 13-22, Jan. 2018.

Joachim Gudmundsson et al., "Spatio-Temporal Analysis of Team Sports", ACM Computing Surveys, vol. 50, No. 2, Article 22, Publication date: Apr. 2017.

Patrick Lucey et al., ""Quality vs Quantity": Improved Shot Prediction in Soccer using Strategic Features from Spatiotemporal Data", MIT Sloan Sports Analytics Conference 2015, Feb. 2015.

* cited by examiner

SEGMENTATION-BASED INVASION SPORTS ANALYSIS AND CONTROL

BACKGROUND

Technical Field

The present invention generally relates to analysis of live-action team-based events and, more particularly, to the identification of segmentation events in a team-based invasion sport.

Description of the Related Art

Team-based invasion sports include football, basketball, hockey, and other sports where teams have well-defined "territory" and players are free to move anywhere on the sports field. Analysis of events within such a game, for example identifying "shot" events in a soccer game, helps the audience to have a deep understanding of the game in progress and can further help with coaching.

SUMMARY

A computer-implemented method for game analysis and control includes for game event analysis and control include determining segmentation events in a game that each represent an interruption in game play or a reset scene. An event analysis is performed using the series of events to determine a contribution value for each event in the series of events that represents how much each respective event in the series of events contributed to the point being scored. Events that have a contribution value that exceeds a baseline value for a respective event type are responded to.

A system for game event analysis and control includes a segmentation event detector configured to determine segmentation events in a game that each represent an interruption in game play or a reset scene. An event analysis module includes a processor configured to perform an event analysis using the series of events to determine a contribution value for each event in the series of events that represents how much each respective event in the series of events contributed to the point being scored. An event response module is configured to respond to events having a contribution value that exceeds a baseline value for a respective event type.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide event analysis for team-based invasion sports based on the identification of segmentation events. A wide variety of events can be identified and then assigned a value according to how much the event contributes to the scoring of a point. However, because there are so many events during a game, the present embodiments identify events that are less important toward scoring a point and events that are more important. Rather than directly performing an analysis of all events, segmentation events are used to separate the important events from relatively unimportant events.

Segmentation events, within the present embodiments, are defined as representing major events that cause an interruption to the flow of play or that cause partial or complete return by players to respective default positions. In general, a segmentation event can be regarded as a major event in the game, where the events immediately leading up to the segmentation event have less bearing on the eventual scoring of a point than those events after the segmentation event.

When a game is interrupted, for example by time running out or a player committing a foul, this interruption is identified as a segmentation event. After an interruption, players generally return to their own positions. During play, reset scenes can also be used to identify segmentation events. Reset scenes are those scenes where players return to their own territory and may come back to their own positions. For example, in the context of soccer, players passing a ball between members of their own team, in their own territory, can be considered a reset scene. The present embodiments employ the covariance of player locations to detect the reset scene.

Other criteria for identifying reset scenes include self area control, where the ball is passed back to the team's own territory (e.g., behind a central line of the playing field), and back of defender, where the ball is passed behind all defenders. In both of these scenarios, play tends to reset and events leading up to the scenario have little effect on the scoring of a point afterward.

The present embodiments are described with specific attention to the game of soccer, but it should be understood that the identification of segmentation events can be used for event analysis in any team-based invasion sport. This contrasts to sports, such as baseball, where players are not free to move about the field and where the order of events is more strictly defined.

Figure 1:
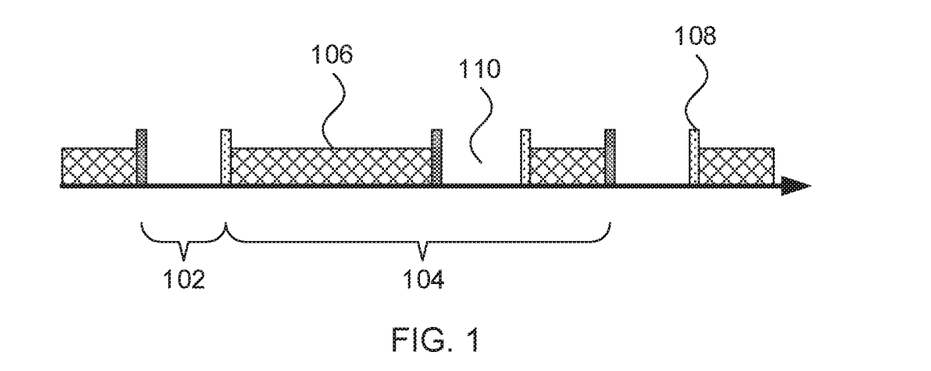
FIG. 1 is a timeline for a game of a team-based invasion sport that shows interruptions and reset scenes in relation to segmentation events in accordance with an embodiment of the present invention.

Referring now to FIG. 1, a portion of an exemplary game timeline is shown. The timeline illustrates interruptions in play 102, where players return to their positions, as well as portions of continuous play 104 that include periods of active play 106 and one or more reset scenes 110. Segmentation events 108 are identified according to these interruptions and reset scenes. Those events that occur between a last segmentation event 108 and the scoring of a point are given greater weight in the analysis.

In one particular embodiment, using soccer as the game being analyzed, events can include a free kick, a corner kick, a throw-in, a goal kick, a penalty kick, a kick-off, and in-play segmentation events. The field is segmented into different regions, representing different potential player positions. When comparing the importance of a particular event, such as a free kick, across the different regions, limiting the free kicks that are being analyzed to those that occur between a final segmentation event and the scoring of a point provides substantially more information than when all free kicks, including those that occur before a segmentation event, are considered. Such an analysis shows, for example, where free kicks are more likely to contribute to a goal, without being diluted by all of the free kicks that were otherwise rendered irrelevant by an intervening segmentation event.

Figure 2:
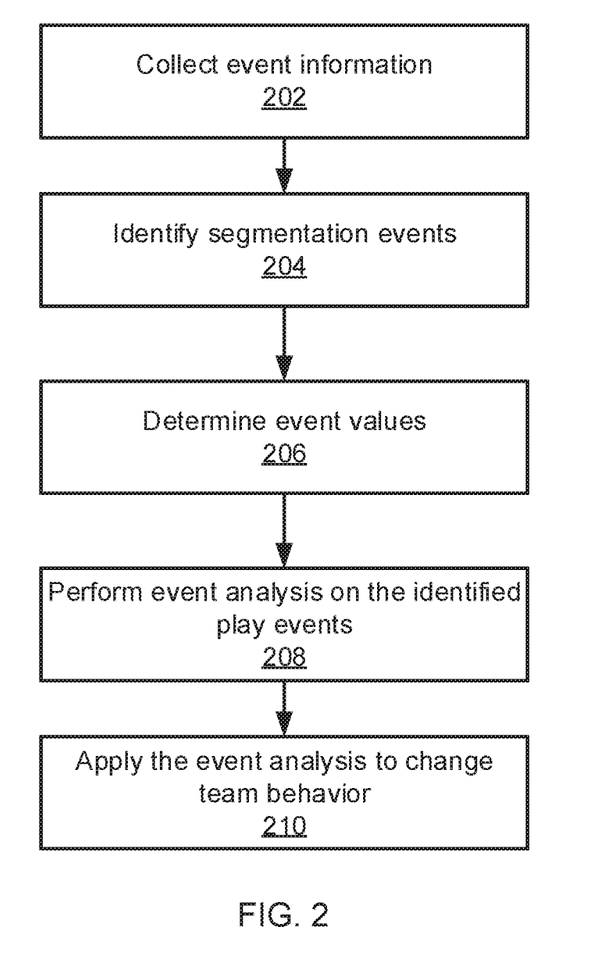
FIG. 2 is a block/flow diagram of a method for analyzing and controlling events in a game using segmentation events to identify important events in accordance with an embodiment of the present invention.

Referring now to FIG. 2, a method for performing event analysis is shown. Block 202 collects event information from a game of a team-based invasion sport. In some embodiments, the event information can be determined from a set of sensors on and around the field, including cameras, positioning sensors, tracking sensors, etc. These sensors provide information about at least the positions of players on the field and, in some embodiments, also provide information regarding the position of other game features, such as a ball. The event information can also include game timer information, for example indicating the present time of the game and whether the clock has stopped. Thus, event information can include low-level information, such as identifying player positions and the state of the game, and can also include high-level information, such as the identification of specific player actions (e.g., a free kick) that may be automatically determined or may, alternatively, be annotated by a human operator.

In another embodiment, an event list can be manually created and can indicate a series of actions with respective timestamps. In one soccer-based example, an event list for one sequence of play could be implemented as [kick-off]→[pass]→[pass]→[pass]→[ball out]. In this example, the ball going out-of-bounds represents an interruption to game play. Interruptions of this kind can be found in the event information as specific events (e.g., ball out, a foul, a goal, intermission, etc.).

Block 204 identifies segmentation events, for example by identifying game interruptions and reset scenes. Block 206 then determines an event value for the segmentation events. Less important events, such as passing a ball between players, need not be considered, depending on the game. In some embodiments, block 206 builds a Markov chain of the segmentation events, with goal events as the time order. A Markov reward model can then be used to perform the calculation. A Markov reward model adds a reward rate to each state and tracks the reward value through time, with value accumulating for as long as the system is in the respective reward state. The states can be represented as a graph that indicates different types of events and respective likelihoods that each event will transition to each other event.

The rewards for different event states can be set according to an analysis desired by the user. In some embodiments, the reward is set to a value of 1 when a point is scored and −1 when an opposing team scores. The state value can be calculated using a Markov decision process, where the current state value is based on reward value and the probability of transition. By solving with the Markov reward model, values for each segmentation event can be determined. Block 208 then performs event analysis on the identified play events. In some embodiments, the processing of block 206 can represent the event analysis of block 208.

The event analysis can be used for a variety of practical applications. In some embodiments, block 210 applies the event analysis to change team behavior. For example, if a given event, such as a free kick, is determined to have a value toward scoring a goal that is significantly higher than a baseline value, then block 210 can indicate a change in player positioning for the defending team to better compensate for the risk. In embodiments where the game in question is performed by robotic or otherwise autonomous players, block 210 can provide instructions to the players to automatically direct their positions to respond to the event. In other embodiments, the event can be flagged on a viewer's screen, to emphasize its relative importance to the gameplay.

The use of a Markov reward model begins with a set of goal events in time order. A state of the game is then defined for each goal event using a set of relevant features. In the context of soccer, for example, the features can include event types, a set of locations within the field of play, team identifiers, the present score, the game time, and so on. The state can include a set of segmentation events leading up to the goal. A state transition matrix $P=\{p_{ij}\}$ is defined for each team pair, where i and j represent the state i,j. The transition probability for each team pair can then be calculated.

Rewards are defined based on an analysis goal. For example, if the goal of the analysis is to determine how likely each event is to contribute to scoring, rewards can be defined to provide large rewards for goal events by a first team and negative rewards if the opposing team scores. Other events can be assigned a score of zero. Based on a Markov decision process, state values can be determined.

Figure 3:
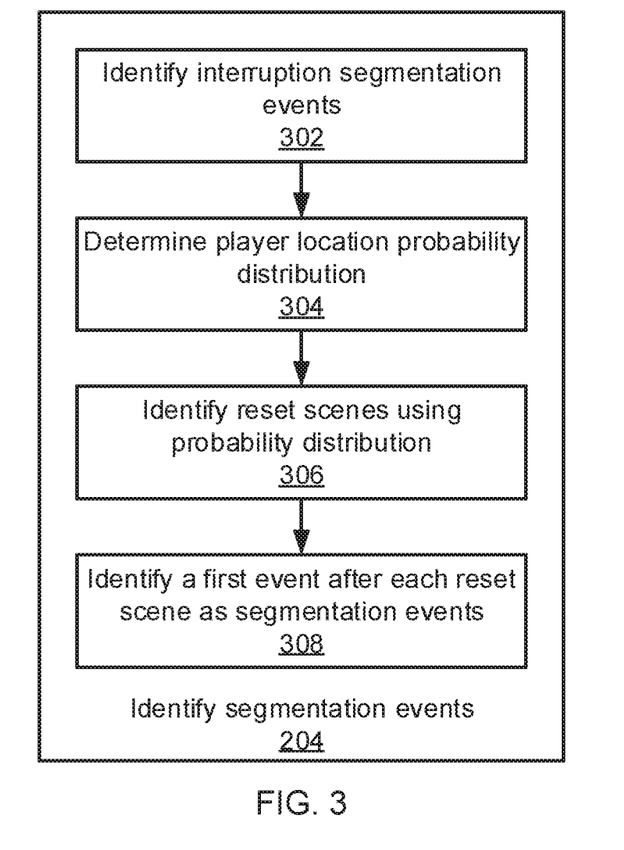
FIG. 3 is a block/flow diagram of a method for identifying segmentation events in a game using interruptions and reset scenes in accordance with an embodiment of the present invention.

Referring now to FIG. 3, additional information is provided on block 204 regarding the identification of segmentation events. Block 302 identifies interruption segmentation events by identifying interruptions in play. As noted above, the event list can include a set of specific events that are interpreted as interruptions of play. Some embodiments can consider only interruptions of a threshold length or greater, as particularly short interruptions may not provide a substantial reset to the state. For example, in a soccer-based example, if the ball goes out of bounds, but is promptly thrown back in, then player positions may not change greatly and events prior to the ball-out event can still affect the likelihood of a goal.

Block 304 then determines a probability distribution for each player's location. The present embodiments may use a multivariate probability distribution, such as a Gaussian or Laplace distribution, to calculate a covariance matric $\Sigma_t$ at each time step t, defined as:

$$\Sigma_t = \begin{pmatrix} \sigma_{xx} & \sigma_{xy} \\ \sigma_{xy} & \sigma_{yy} \end{pmatrix}$$

where x and y represent player coordinates on the field. Eigenvalues are determined as $(a_t, b_t)$ from the covariance matrix and an area S is calculated as $S(t)=\pi a_t b_t$. In general, a covariance matrix has elements that represent the covariance between corresponding elements of a random vector.

If $\forall t \in [t_0, t_0+t_{ij}]$: $S(t)>S$, $t_0>T$, then $[t_0, t_o+t_n]$ is identified at block 306 as a reset scene 110, where the players have scattered to an area that exceeds S. This scattering contrasts to a relatively intense scene, where players tend to clump together around a point of focus (e.g., the ball). Thus, when players spread out, this indicates a reset scene. The terms S and T are hyperparameters that relate to a minimum area and time duration and can be optimized by a testing process. This optimization can be performed by preparing a labeled data set and optimizing S and T to extract similar reset scenes using any appropriate machine learning training process. Another way to determine S can be to use an average value of $\pi a_t b_t$ across a large set of games.

Block 308 identifies the first events after the identified reset scenes 110 as being segmentation events 108. The extracted segmentation events can be defined according to event type, game time, team performing the event, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
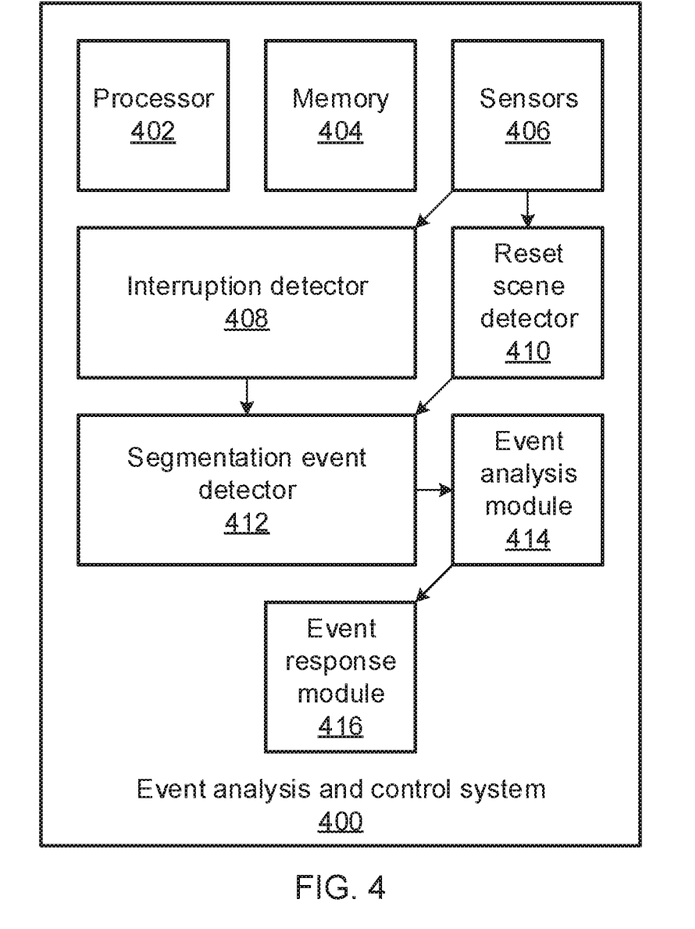
FIG. 4 is a block diagram of an event analysis and control system that uses segmentation events to identify important events in accordance with an embodiment of the present invention.

Referring now to FIG. 4, an event analysis system 400 is shown that includes a hardware processor 402 and a memory 404. The event analysis system 400 includes one or more sensors 406 that monitor the state of a sporting event, for example monitoring the positions of players and their actions on a field. The sensors 406 can be integral with the system 400 as shown, or can be implemented as separate devices that communicate sensor information to the system 400 by a wired or wireless communication medium. The system 400 also includes one or more functional modules. In some embodiments, the functional modules are implemented as software that is stored in the memory 404 and that is executed by hardware processor 402. In other embodiments, one or more module may be implemented as one or more discrete hardware components in the form of, e.g., application-specific integrated chips or field programmable gate arrays.

An interruption detector 408 uses event information provided by the sensors 406 to identify interruptions in the game. In some embodiments, interruptions of the game may be determined by identifying points where the game clock stops. A reset scene detector 410 uses the event information provided by the sensors to identify reset scenes based on, e.g., player positions. A segmentation event detector 412 uses the identified interruptions and the identified reset scenes to detect segmentation events.

An event analysis module 414 uses the detected segmentation events to perform event analysis on the game, for example by determining a value for events in accordance with their respective contributions to the scoring of a point. An event response module 416 then responds to events that have been determined to have values that are substantially above a baseline value. For example, if training data indicates that free kicks generally have a contribution value of 0.1, but a particular free kick event is determined to have a contribution value of 0.4, then event response module 416 can respond to the high-value event. This response can take a variety of forms, from providing additional information (e.g., an indication or alert on a viewer's screen) to automatically controlling player positions to respond to the high-value event.

Figure 5:
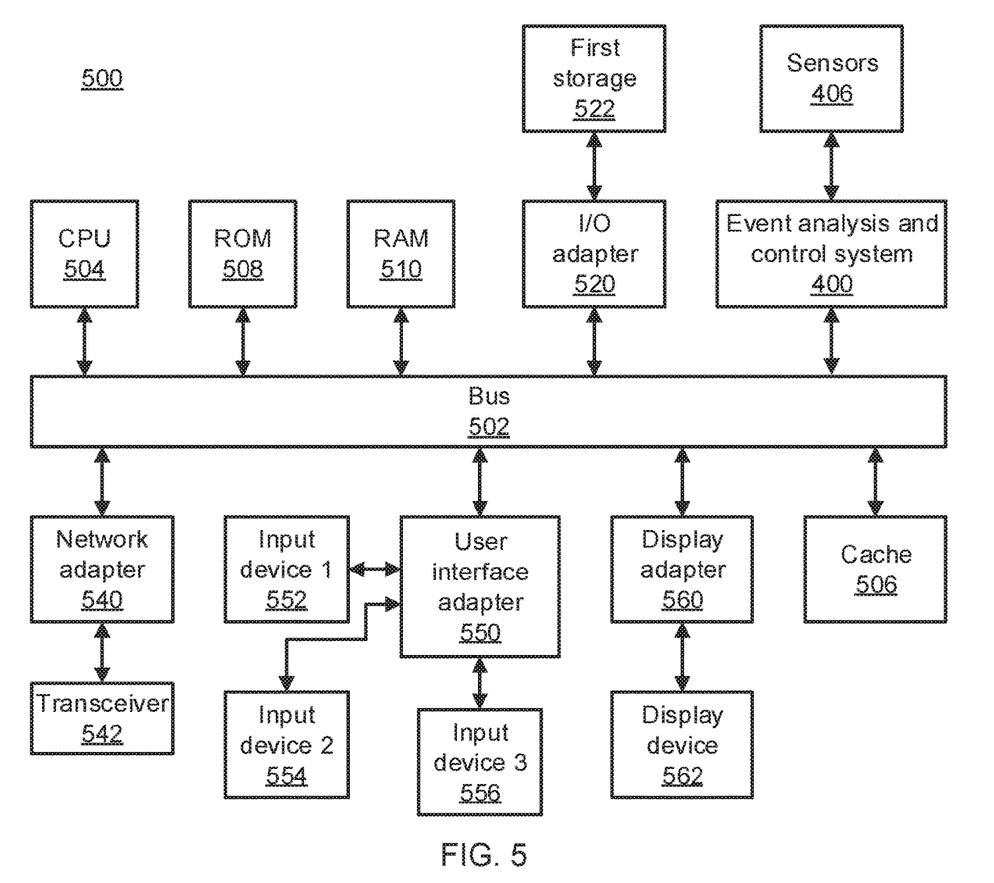
FIG. 5 is a block diagram of a processing system in accordance with an embodiment of the present invention.

Referring now to FIG. 5, an exemplary processing system 500 is shown which may include the event analysis system 400. In this embodiment, the event analysis system 400 is represented as a component of a larger processing system 500, certain components being broken out to show their structural relationship to other components. For example, hardware processor 402 is represented as CPU 504 and memory 404 is represented as RAM 510 and/or first storage 522. The functions of the event analysis system 400 are performed as described above within the workings of the processing system 500 as a whole. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a network adapter 540, a user interface adapter 550, and a display adapter 560, are operatively coupled to the system bus 502.

A first storage device 522 is operatively coupled to system bus 502 by the I/O adapter 520. The storage device 522 can be any of a disk storage device (e.g., a magnetic or optical disk storage device), a solid state magnetic device, and so forth.

A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Having described preferred embodiments of segmentation-based invasion sports analysis and control (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for game event analysis and control, comprising:
   determining segmentation events in a game that each represent an interruption in game play or a reset scene by comparing a product of eigenvalues of a covariance matrix to a threshold parameter to determine whether players have spread out on a game field, where the covariance matrix reflects player locations at respective times;
   performing an event analysis using the series of segmentation events to determine a contribution value for each event in the series of segmentation events that represents how much each respective event in the series of segmentation events contributed to a point being scored; and
   responding to events having a contribution value that exceeds a baseline value for a respective event type.

2. The computer-implemented method of claim 1, wherein determining segmentation events includes detecting conditions where gameplay stops.

3. The computer-implemented method of claim 1, wherein determining segmentation events further includes determining that time periods where the product of eigenvalues of the covariance matrix exceeds the threshold parameter represent reset scenes.

4. The computer-implemented method of claim 2, wherein determining segmentation events includes identifying a first event after an interruption or a reset scene as being a segmentation event.

5. The computer-implemented method of claim 1, wherein the game is a team-based invasion sport.

6. The computer-implemented method of claim 1, wherein performing event analysis includes determining a Markov reward model using the segmentation events.

7. The computer-implemented method of claim 1, wherein responding to events includes directing player positioning.

8. The computer-implemented method of claim 7, wherein directing player positioning includes sending instructions to robotic players to cause those robotic players to move on a field of play.

9. A non-transitory computer readable storage medium comprising a computer readable program for game event analysis and control, wherein the computer readable program when executed on a computer causes the computer to perform the steps of:
   determining segmentation events in a game that each represent an interruption in game play or a reset scene by comparing a product of eigenvalues of a covariance matrix to a threshold parameter to determine whether players have spread out on a game field, where the covariance matrix reflects player locations at respective times;
   performing an event analysis using the series of segmentation events to determine a contribution value for each event in the series of segmentation events that represents how much each respective event in the series of segmentation events contributed to a point being scored; and
   responding to events having a contribution value that exceeds a baseline value for a respective event type.

10. A system for game event analysis and control, comprising:
    a segmentation event detector configured to determine segmentation events in a game that each represent an interruption in game play or a reset scene, by comparing a product of eigenvalues of a covariance matrix to a threshold parameter to determine whether players have spread out on a game field, where the covariance matrix reflects player locations at respective times; and
    an event analysis module including a processor configured to perform an event analysis using the series of segmentation events to determine a contribution value for each event in the series of segmentation events that represents how much each respective event in the series of segmentation events contributed to a point being scored; and
    an event response module configured to respond to events having a contribution value that exceeds a baseline value for a respective event type.

11. The system of claim 10, wherein the segmentation event detector is further configured to detect conditions where gameplay stops.

12. The system of claim 10, wherein the segmentation event detector is further configured to determine that time periods where the product of eigenvalues of the covariance matrix exceeds the threshold parameter represent reset scenes.

13. The system of claim 11, wherein the segmentation event detector is further configured to identify a first event after an interruption or a reset scene as being a segmentation event.

14. The system of claim 10, wherein the game is a team-based invasion sport.

15. The system of claim 10, wherein performing event analysis includes determining a Markov reward model using the segmentation events.

16. The system of claim 10, wherein the event response module is further configured to direct player positioning.

* * * * *